T. A. BRUNT.
WEIGHING TRUCK.
APPLICATION FILED MAY 17, 1911.

1,020,597.

Patented Mar. 19, 1912.

Witnesses:
Katherine Macdonald
Thomas Green

Inventor:
Thomas A. Brunt
by W. T. Cuff Quin
atty.

COLUMBIA PLANOGRAPH CO., WASHINGTON, D. C.

UNITED STATES PATENT OFFICE.

THOMAS A. BRUNT, OF RENFREW, ONTARIO, CANADA, ASSIGNOR TO MICHAEL J. O'BRIEN, OF RENFREW, CANADA.

WEIGHING-TRUCK.

1,020,597. Specification of Letters Patent. Patented Mar. 19, 1912.

Application filed May 17, 1911. Serial No. 627,824.

*To all whom it may concern:*

Be it known that I, THOMAS A. BRUNT, a subject of the King of Great Britain, residing at the town of Renfrew, in the county of Renfrew, in the Province of Ontario, Canada, have invented certain new and useful Improvements in Weighing-Trucks, of which the following is a specification.

The invention relates to improvements in "weighing trucks" as described in the present specification and illustrated by the accompanying drawings that form part of the same.

The invention consists essentially of a hand-truck provided with a suitable platform loosely mounted upon a weighing scale frame suspended below the top of the truck and connected to a weighing scale carried by the truck.

The objects of the invention are to provide a hand truck with an accurate weighing scale capable of weighing from one pound to two thousand pounds, a weighing truck that will be simple and comparatively inexpensive to manufacture, and at the same time thoroughly reliable and not likely to get out of order.

Figure 1:
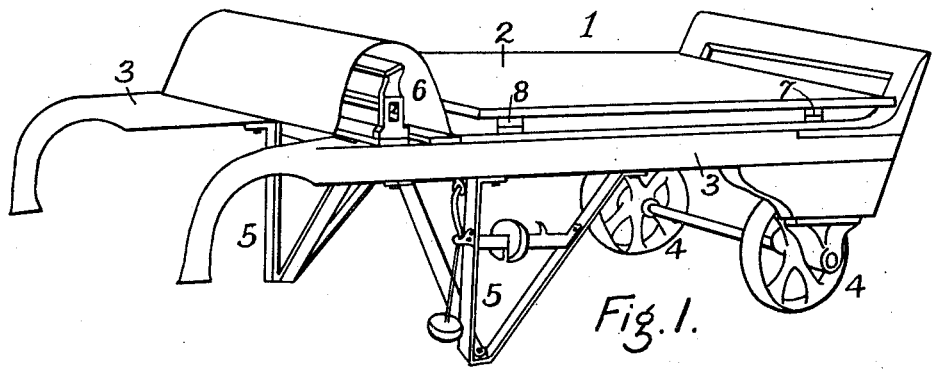
Figure 2:
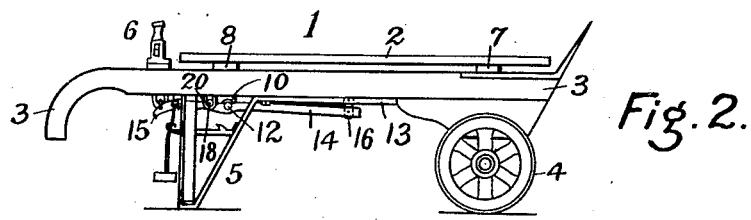
Figure 4:
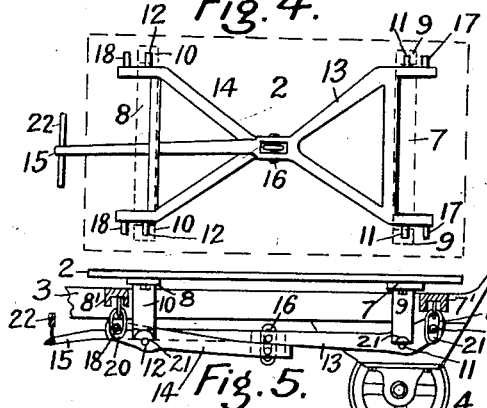
Figure 3:
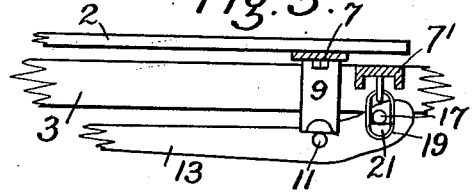
Figure 5:
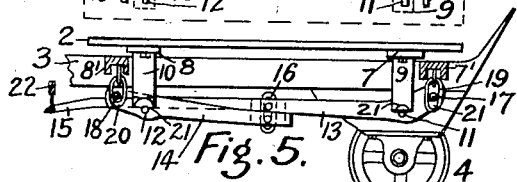
Figure 6:
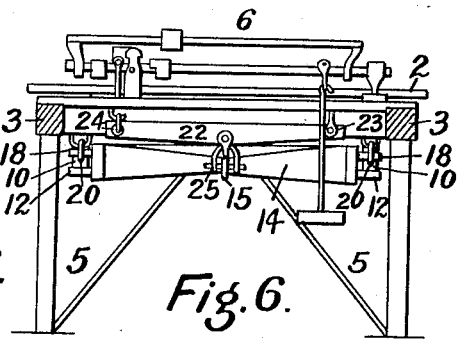
Figure 7:
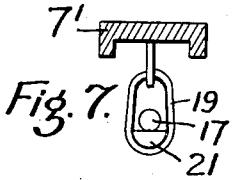
Figure 8:
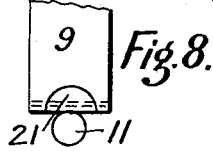

With these and other objects in view reference is had to the accompanying drawings in which like numerals of reference indicate corresponding parts in each figure, and in which, Figure 1. is an isometrical view. Fig. 2. is a side elevation. Fig. 3. is an enlarged detail view showing relative position of the platform to the rear operating lever. Fig. 4. is a detailed bottom plan view, showing relative positions of the operating levers. Fig. 5. is a side elevation of Fig. 4. Fig. 6. is a detailed end view showing the relative position of the operating levers to the weighing scale. Fig. 7. is a detailed view of the method of suspension. Fig. 8. is a detailed view of bearings.

In the drawings, 1 is the device as a whole comprising a rectangular hand-truck frame with the sides 3, and having thereon the platform 2.

4 are the wheels of the truck frame and 5, the front legs or rests.

6 is the weighing scale mechanism provided with a suitable cover 6'.

7 and 8 are cross-bars secured to the platform 2 and provided with legs 9 and 10 and having curved steel bearings 21 adapted to fit the lugs or pins 11 and 12.

13 and 14 are the back and front levers comprising the scale frame, of suitable formation and fulcrumed at 16, and having an extension 15 to the weighing scale 6, engaging with the scale beam 22 by means of the link support 25.

7' and 8' are the rear end and front end cross bars of the truck-frame having suitably secured thereto the link supports 19 and 20 adapted to engage with the lugs 17 and 18 on the rear end of the lever 13 and the front end of the lever 14 respectively.

21 are curved steel bearings adapted to the supporting legs of the platform and to the lugs 11 and 12, and to the link supports 19 and 20 of the levers 13 and 14.

22 is the scale beam pivoted at 23 and linked at 24 to operate the weighing scale.

The lugs 11 and 12 are eccentrically arranged in relation to the lugs 17 and 18 of the suspension links 19 and 20.

From the foregoing it will be apparent that, when an object is placed on the platform 2, the supporting legs 9 and 10 will press on the lugs 11 and 12, causing a depression of the levers 13 and 14, which in turn will cause the extension 15 to operate the weighing scale beam 22 through the link connection 25.

Since the foregoing description is of but a preferred embodiment of my invention, I desire it understood that various changes in the details of the device may be resorted to without in any way departing from the spirit of the invention as expressed in the claim.

What I claim for my invention is:—

A weighing truck comprising a truck frame, a weighing scale having a beam mounted thereon, a pair of forked centrally fulcrumed levers suspended in said frame, a central longitudinal extension integral with one of said levers, two cross bars secured to the under part of said frame and near each end thereof respectively, two link supports suspended from each end respectively of said cross-bars, curved bearings fitting into said links and a lug in each leg of said levers, near the outer ends thereof, fitting in said links and working on said bearings, in combination with a pin in each leg of said levers between the lug and the crotch, a platform, two cross bars on the lower face of the platform, near each end thereof respectively, four supporting legs attached to said platform cross bars, one near each end of each cross bar, and engaging said pins to support said platform and operate said levers, bearings in the lower part of said legs and a link connecting said extension and said scale beam.

In testimony whereof I have hereunto subscribed my name at Renfrew in the county of Renfrew, Province of Ontario, Canada, in the presence of two subscribing witnesses this 22nd day of March, 1911.

THOMAS A. BRUNT.

Witnesses:
JOHN GEALE,
S. T. CHOWN.

Copies of this patent may be obtained for five cents each, by addressing the "Commissioner of Patents, Washington, D. C."